Patented Aug. 15, 1933

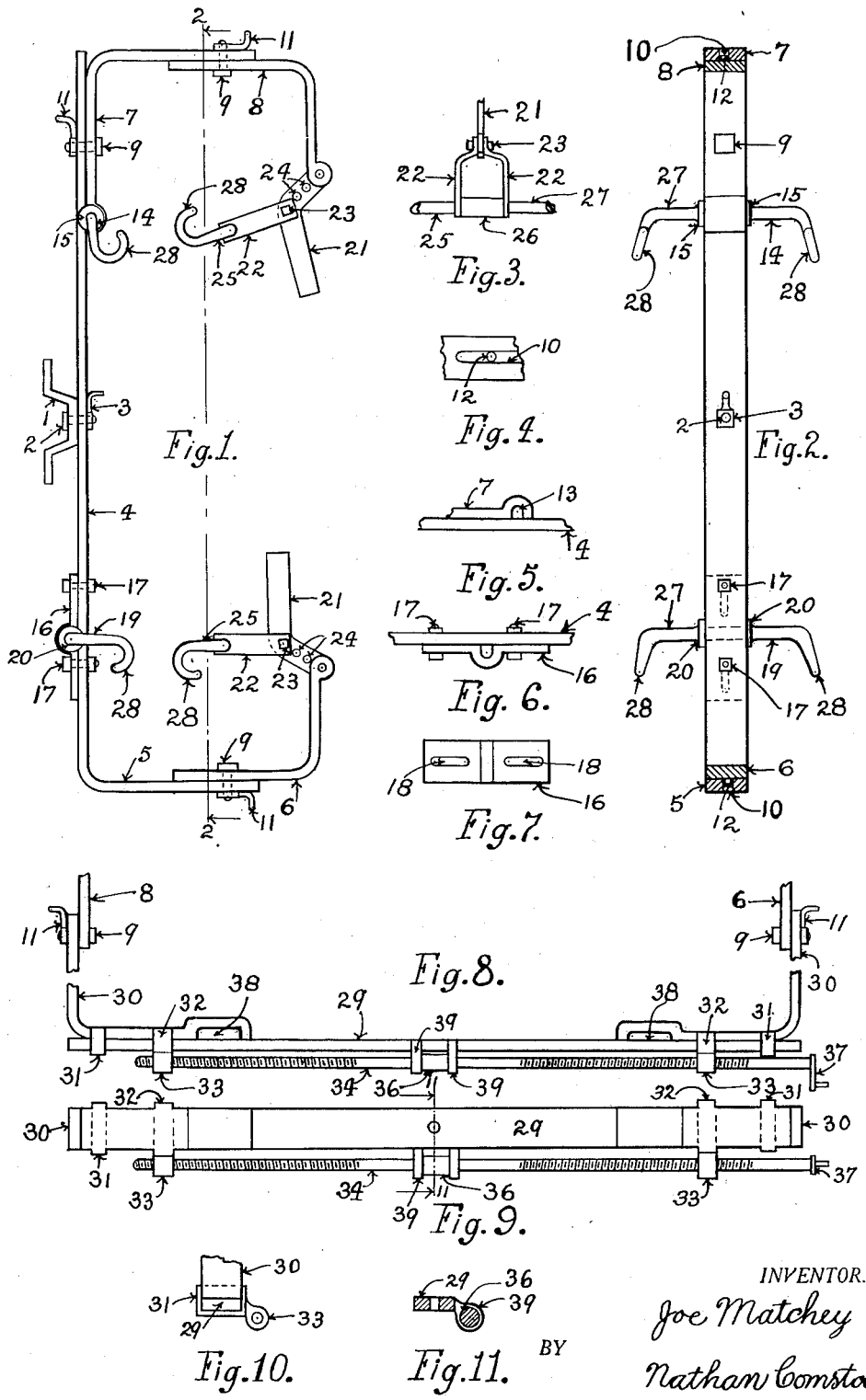
Aug. 15, 1933.   J. MATCHEY   1,922,740
TIRE SPREADER
Filed May 7, 1932

1,922,740

UNITED STATES PATENT OFFICE 1,922,740

TIRE SPREADER

Joseph Matchey, Whitehall, Wis.

Application May 7, 1932. Serial No. 609,877

9 Claims. (Cl. 154—9)

My invention relates to improvement in tire spreaders in which hooks engage the beads of the pneumatic tire on opposite sides and are drawn or forced apart to spread the tire so that the inner tube may be easily inserted or removed, and the inside of the tire inspected or repaired; and the objects of my invention are, first, to provide a spreader which will spread and hold the whole tire open at one time; second, to provide a spreader so mounted that it may be readily adjusted and held in position convenient for work upon the tire; third, to provide a spreader which is readily adjustable for various sizes of tires and is adapted for use upon tires varying in cross section without adjustment; fourth, to provide a spreader in which the spreading means when in position with the tire open will remain therein and be securely held by the tendency of the tire to contract; fifth, to provide means for adjustment of the frame and other parts of the spreader; sixth to provide improved means for supporting and adjusting the tire hooks; seventh, to provide improved tire hooks; eighth, to provide improved structural details in a tire spreader; and ninth, to provide a compact tire spreader of simple structure, which may be easily and cheaply manufactured.

I attain these objects and other objects and advantages which will appear from the description and claims by mechanism illustrated in the accompanying drawing, in which—

Figure 1, is a side elevation of my spreader; Fig. 2, is a sectional elevation taken on the line 2—2 of Fig. 1, looking in the direction of the arrows; Fig. 3, is a fragmentary detail of the elbow lever, with the stirrup and hook; Fig. 4, is a bottom plan of a portion of the frame showing the adjusting slot and the stud for preventing rotation of the parts; Fig. 5, is a side elevation of a portion of the frame showing a journal bearing for holding a tire hook; Fig. 6, is a side elevation of a portion of the frame with slidable journal bearing for a tire hook; Fig. 7, is a top plan of the slidable journal bearing; Fig. 8, is a side elevation of a part of a modified form of frame structure; Fig. 9, is a top plan of the frame structure shown in Fig. 8, parts being removed; Fig. 10, is a fragmentary end elevation of the structure shown in Fig. 9; and Fig. 11, is a section taken on the line 11—11 of Fig. 9, looking in the direction of the arrows, parts being omitted.

Similar reference numerals refer to similar parts throughout the several views.

A bracket 1, adapted to be fastened to a post or wall carries a bolt 2, on which is pivotally mounted a frame of substantially rectangular form with a part of one of the sides removed. A tail nut 3, on the bolt 2 serves to clamp the frame in any desired position against the bracket.

The frame is formed of the bar 4, having one end 5, bent at right angles to form a part of one of the ends of the frame. Adjustibly secured to the end 5, of the bar 4, is a bar 6, which is bent at right angles so that its outer end forms a part of a side of the frame. Adjustably secured to the other end of the bar 4, is a bar 7, which is bent at right angles, and a bar 8, is adjustably secured to the outer end of the bar 7, and is bent at right angles so that its outer end forms a part of the side of the frame.

The adjustment of the bars 5 and 6, 4 and 7, and 7 and 8, upon one another is effected by means of bolts 9, carried by one of the bars fitting and sliding within slots 10 in the other bar. Tail nuts 11, on the bolts 9, serve to hold the bars together and clamp them in adjusted position. Studs 12 on one of each pair of bars project into the slots 10, and prevent rotation of the bars upon the bolt 9.

The end of the bar 7 which is secured to the bar 4, is formed into a journal bearing 13, as shown in Fig. 5, adapted to receive and hold the tire hook, which is designated as a whole as 14, and which is confined therein by the bar 4, and moves longitudinally of the bar 4, with adjustment of the bar 7. Collars 15 upon the hook 14, bear against the sides of the bearing 13 and bar 4, and prevent endwise movement of the hook 14.

A journal plate 16, is slidably secured to the bar 4, near the end 5, by the stud bolts 17, in the bar 4, passing through slots 18, in the plate. A tire hook which is designated as a whole as 19, is journalled in the plate, and rotatably confined between it and the bar 4, and is slidable longitudinally with the plate. Collars 20 upon the hook 19 bear against the sides of the plate 16 and bar 4, and prevent endwise movement of the hook 19.

Pivotally secured to the outer ends of the bars 6 and 8, are elbow levers 21, Stirrup plates 22, are pivotally secured to each of these levers by bolts 23, and may be adjusted thereon by means of the apertures 24. Tire hooks designated as a whole as 25, are rotatably mounted in the stirrup plates 22, and are prevented from endwise movement by the bosses or collars 26, upon the hooks 25, between the plates 22.

The tire hooks 14, 19 and 25, are formed of a rod like member 27 with its ends bent downwardly and the downwardly bent portions formed into hooks 28 for engaging the beads of a tire. The rod 27 is of such length that the hooks 28 are suitably spaced so that on their engagement with the beads of a tire, the actuation of the levers to open the tire will open the whole tire. Obviously a single lever may be actuated to open only a part of the tire. The hooks 14, 19 and 25 all being rotatably mounted may be readily engaged with the beads of tires of different cross sections without adjustment of the frame, and such engagement is further facilitated by the sliding movement of the hook 19, and the pivotal movements of the levers 21, and the stirrup plates 22.

In Figs. 8, 9, 10 and 11, I have shown a modified form of the frame structure and means for adjusting the same for different sizes of tires. In this form the closed side of the frame is a straight bar 29, upon which bars 30, having their outer ends bent at right angles, are slidably mounted and held thereon by depending bands or loops 31 and 32, which embrace the bar 29. The bands 32, are provided with nuts 33, to engage a right and left handed screw, threaded bar 34, which is supported by the ears 39, depending from the bar 29, and is held against longitudinal movement by a collar or boss 36 thereon, fitting between the ears 39. The screw threaded bar 34 is provided with a handle 37, for turning the screw to adjust the bars 30 towards or away from each other. The inner ends of the bars 30 are formed into elongated journal bearings 38, within which the hooks 14 and 19, are slidably and rotatably confined by the bar 29, and may be moved longitudinally the length of the journals independently of the adjustment of the bars 30.

The bars 6 and 8 of the frame are adjustably secured to the bars 30 by the same structures as those shown and described in connection with Fig. 1, of the drawing.

In operation the frame is adjusted to the size of the tire, and the hooks 14 and 19, engaged with the bead on one side of the tire, and the hooks 25 engaged with the bead on the opposite side of the tire, the elbow levers 21, are then turned outwards on their pivots until they lie against the outside of the bars to which they are pivoted, thus spreading the tire; this movement is permitted by the stirrups passing over the pivotal connections of the bars and levers, and when so placed against the outside of the bars the levers will remain in this position since the pivotal connections of the stirrups with the levers are behind those of the levers and bars, and any pull upon the hooks 25, as by the tire tending to close will draw and hold the levers more firmly against the bars, so that no latching or locking of the levers is required to hold the tire spread. After the tire has been spread the frame may be turned on its pivot, and clamped in position most suitable for inspection of or work upon the tire.

While I have shown and described specific structures my improvement is not to be understood as limited thereto, and the following claims are intended to include all novelty disclosed as broadly as the state of the art will permit.

I claim:

1. In a tire spreader, the combination of means for pivotally supporting a frame, a frame having a part of one side open, means for clamping said frame to its support, means whereby the length and width of the frame may be adjusted to the diameter and width of the tire, means rotatably and slidably journalled on the closed side of the frame adapted to engage the bead of a tire, levers pivoted to each end of the open side of the frame, means pivoted on each of said levers, and means rotatably mounted in said pivoted means adapted to engage the other bead of the tire, so that when the levers are turned upon their pivots against the outside of the frame to spread the tire the line of stress between the tire engaging means and the pivotal connections of the levers and the means in which the tire engaging means are rotatably mounted is outside of the pivotal connections of the levers and frame.

2. The combination in a tire spreader, of a frame having a part of one side open, means whereby the length and width of the frame may be adjusted to the diameter and width of the tire, means rotatably and slidably journalled on the closed side of the frame adapted to engage the bead of a tire, levers pivoted to each end of the open side of the frame, means pivoted on each of said levers for carrying means to engage the bead of a tire, and means rotatably mounted in said pivoted means adapted to engage the other bead of the tire, so that when the levers are turned upon their pivots against the outside of the frame to spread the tire the line of stress between the tire engaging means and the pivotal connections between the levers and the means for carrying means to engage the bead of the tire is outside of the pivotal connections of the levers and frame.

3. The combination in a tire spreader of a frame member, a second frame member slidably adjustable thereon having a journal bearing at its end, a tire hook rotatably mounted in said bearing and slidable therewith, a journal plate slidably secured to said first frame member, and a tire hook rotatably mounted in said journal plate and slidable therewith and adapted to engage the bead of a tire at points opposite the first tire hook.

4. The combination in a tire spreader, of a frame, an elbow lever pivoted to the frame, stirrup plates pivoted to the lever, a tire hook rotatably mounted in the stirrup plates, whereby when the lever is turned outwards against the outside of the frame the stirrup plates may pass over the pivot point of the lever and frame so that the line of stress between the lever and tire hook is outside of the pivotal connection of the lever and frame.

5. The combination in a tire spreader, of a supporting bracket, a frame member pivoted to the bracket, a clamp for securing the frame member to the bracket, said frame member having one end bent at right angles, a second frame member having its outer portion bent upwardly at right angles secured to the bent end of the first frame member and adjustable longitudinally thereon, means for holding said members in adjusted relation, a third frame member bent at right angles secured to the other end of the first frame member and adjustable longitudinally thereon, means for holding said members in adjusted relation, a fourth frame member having one end bent downwardly at right angles secured to the outer end of the third frame member and adjustable longitudinally thereon, means for holding said members in adjusted relation, a tire hook journalled in the end of the third frame member and adjustable therewith upon the first frame member, a slidable journal bearing secured to the first frame member near the bent end, a tire hook journalled in said bearing and slidable therewith, elbow levers pivoted to the outer ends of the second and fourth frame members, stirrup plates pivoted to said elbow levers and adjustable thereon, and tire hooks journalled in said stirrup plates.

6. The combination in a tire spreader of a frame having an opening at one side, tire hooks adapted to engage the bead on one side of a tire pivotally secured to the closed side of the frame, elbow levers pivotally secured to the ends of the frame at the opening, stirrup plates pivotally secured to the elbow levers, and tire hooks rotatably held by said stirrup plates.

7. In combination in a tire spreader, a frame, means pivotally supporting the frame, means for clamping the frame to its support, means on said frame for engaging one side of a tire, means on said frame for engaging the opposite side of a tire, and means adapted to be retained in holding position by the tension of the tire for moving and holding said engaging means apart to spread the tire.

8. The combination in a tire spreader, of a frame member slidably adjustable longitudinally of the first frame member and provided with an open journal bearing at its end adapted to be closed by said first frame member, means for adjustably securing said members together, and a tire hook in said journal bearing rotatable therein and adjustable therewith.

9. The combination in a tire spreader of a frame for supporting the tire, a support for the frame, a pivot member connecting the frame and support, and a clamp member on the pivot adapted to bear against the frame to clamp it to the support.

JOSEPH MATCHEY.